R. W. BOJE, Jr.
HOSE COUPLING.
APPLICATION FILED APR. 22, 1915.
1,148,824. Patented Aug. 3, 1915.
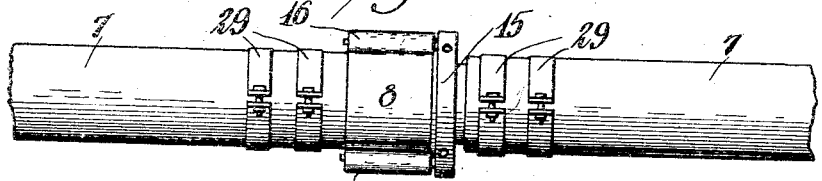
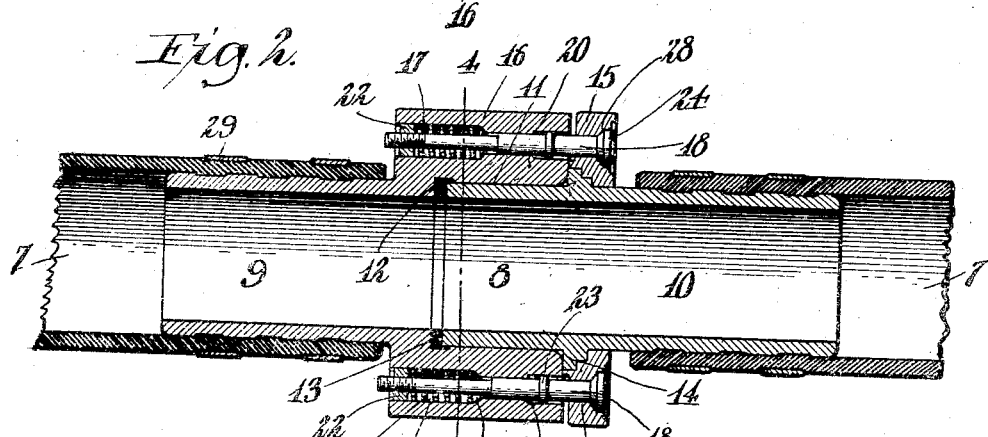
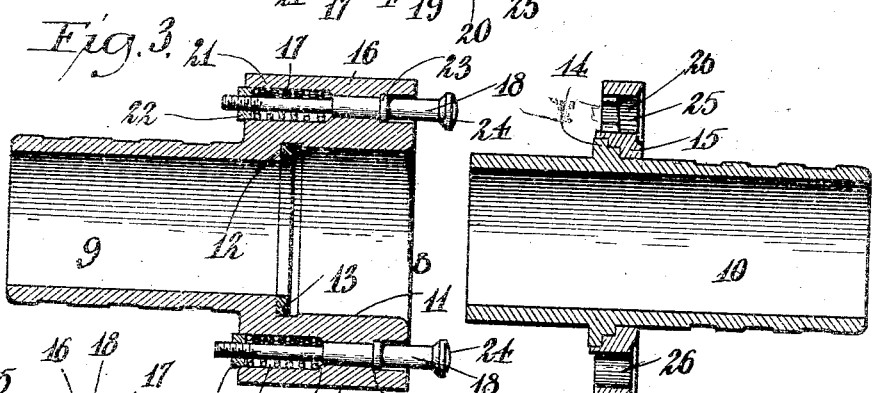
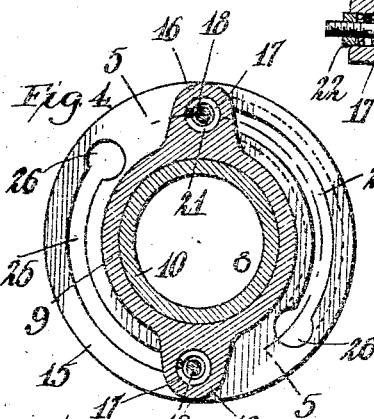 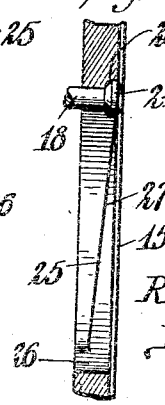 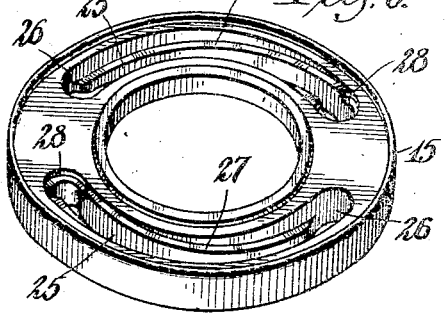
Rudolf W. Boje, Jr., Inventor.
Witness: Jacob Olsen Jr. By Emil Kendorf, Attorney.

UNITED STATES PATENT OFFICE.

RUDOLF W. BOJE, JR., OF BUFFALO, NEW YORK.

HOSE-COUPLING.

1,148,824.  Specification of Letters Patent.  Patented Aug. 3, 1915.

Application filed April 22, 1915. Serial No. 23,180.

*To all whom it may concern:*

Be it known that I, RUDOLF W. BOJE, Jr., a subject of the Emperor of Germany, residing at Buffalo, in the county of Erie and State of New York, have invented certain new and useful Improvements in Hose-Couplings, of which the following is a specification.

My invention relates to improvements in hose couplings, and more particularly to a quick acting hose coupling such as is employed for coupling the ends of consecutive lengths of fire hose.

The object of my invention is to provide a simple and effective coupling whereby the ends of adjoining lengths of hose may be quickly united or disconnected without the necessity of turning the respective lengths of hose relatively.

A further object is the provision of a coupling of this type having few parts and which requires only the proper relative placement of one part with respect to another and the actuation of a single locking element.

The invention consists in the novel features of construction and in the arrangement and combination of parts to be hereinafter described and particularly pointed out in the subjoined claims.

In the drawings,—Figure 1 is an elevation of a hose showing two adjoining lengths coupled together by means of my improved coupling. Fig. 2 is a longitudinal section through the coupling and the adjacent ends of two adjoining hose lengths. Fig. 3 is a longitudinal section through the coupling showing the two main members disconnected. Fig. 4 is a transverse section taken on line 4—4, Fig. 2. Fig. 5 is a section taken on line 5—5, Fig. 4. Fig. 6 is a detached perspective view of the locking member.

Reference being had to the drawings in detail, the reference numeral 7 designates two adjoining hose lengths coupled together by means of my improved coupling 8.

The coupling comprises two main members 9, 10, which are preferably in the form of tubes or hollow cylinders, one of which is counterbored, as at 11, to receive the adjacent end of the other, thus these members are in the form of male and female parts, one fitting partly into the other. By counterboring the member 9, an internal shoulder 12 is provided against which is seated a gasket 13, and the inner end of member 10 is adapted to be forcibly pressed against said gasket so as to make a watertight joint between the two members. The male member has an external annular flange 14 between its ends which, as shown, is stepped, and fitting around said male member is a locking member 15 in the form of a ring, the opening of said locking member being double counterbored to correspond to the stepped flange 14 on the male member. The flange 14 enters said counterbored opening so as to provide a plurality of smooth bearing surfaces which tend to minimize the tendency of the parts wearing, due to one turning upon the other and this construction also renders the parts free in action.

The female member has elongated lugs or extensions 16 at diametrically opposite points, each of said extensions having a longitudinal bore 17 formed therein. Slidably retained in said bores are yielding locking pins or studs 18. Each of the bores 17 is enlarged at opposite ends to provide oppositely-facing shoulders 19, 20. Arranged in one of said enlarged portions and surrounding the pin or stud 18 is a coiled spring 21 which bears with one end against the shoulder 19 and with its other end against a nut 22 threaded onto the pin or stud 18, said nut being confined within the bore and made adjustable on the pin or stud so as to regulate the tension of the spring. Against the other shoulder 20 is adapted to bear a collar or flange 23 formed on the pin 18. This collar limits the movement of said pin in one direction, such movement being caused by the expansion of spiral spring 21 surrounding the pin. The opposite pins are placed under equal tension so that they will act in unison and exert equal pressure in coupling the members of the coupling together. Said locking pins project beyond the outer end face of the female member 9 and are provided with enlargements or heads 24 at their projecting ends.

The locking member or ring 15 is provided with segmental slots 25, each slot being enlarged at one end, as at 26, the enlargements being of a size to permit the heads 24 of the pins 18 to be passed therethrough. The outer face of the locking member is provided at opposite sides of the slots 25 with inclined or wedge-shaped portions 27 which ride under and in contact with the heads of the pins when turning the locking member. This movement of the locking member causes compression of the springs 21 by reason of the locking pins being moved outwardly, such movement being continued until the pins reach the opposite ends of the slots at which points the highest elevation of the inclined or wedge-shaped portions 27 are reached, and directly beyond depressions 28 are formed to receive the heads 24 of the locking pins. When the heads are seated in the depressions, accidental uncoupling of the parts cannot take place, since the springs 21 are placed under sufficient tension to prevent outward movement of the locking pins sufficiently to cause the heads thereof to ride onto the wedge-shaped or inclined portions 27 without sufficient manual effort being exerted to cause such action. The outer cylindrical ends of the main members have the hose sections 7 secured thereto by means of clips 29, or other suitable means.

In order to couple two lengths of a hose together, it is simply necessary to insert the male member 10 partly into the female member until the stepped flange of the male member closely approaches or bears against the outer face of the female member. The locking ring 15 is then positioned to enter the locking pins in the segmental slots 25, and as the collars or flanges 23 of said pins hold the latter projected a certain distance so that the heads of the same are positioned to ride upon the inclined or wedge-shaped portions of said slots, it is only necessary to rotate the locking ring, whereupon the members 9 and 10 are pressed firmly into position, they being retained by the locking pins which are held properly seated against the ring by said springs. Reverse action of the parts in only necessary in order to disconnect the hose lengths.

Having thus described my invention, what I claim is,—

1. A hose coupling comprising two tubular members, one of which has its coupling end fitted into the other and provided with an external flange adapted to bear against said other member, said last-mentioned member having spring-retracted locking pins projecting from the coupling end thereof, means to prevent retraction of said locking pins beyond certain points, and a locking member fitting said flanged tubular member and having segmental slots adapted to receive said locking pins, said slots being provided with inclined faces against which said pins bear.

2. A hose coupling comprising a male member provided with an external flange, a female member into which the coupling end of said male member fits and which is provided with elongated lugs at diametrically opposite points, locking pins slidably arranged within said lugs, springs surrounding said pins and holding them to the end of their movement in one direction, and a locking ring rotatable on said male member and counterbored to receive the flange of the latter, said locking member having inclined surfaces co-acting with said locking pins to cause said springs to be compressed and said male and female members to be firmly connected through the medium of said locking ring.

3. A hose coupling comprising a male and a female member, said male member having a coupling end fitting into said female member and being provided with an annular external stepped flange, a locking ring rotatable on said male member counterbored to receive said stepped flange, and spring-retracted locking pins carried by said female member and adapted to co-act with said locking ring, said locking pins having enlargements and said locking ring having segmental slots provided with inclined faces co-acting with said enlargements.

4. A hose coupling comprising two members, one a male member having an external flange and the other a female member having an internal shoulder against which the inner end of said male member is adapted to bear, said female member having elongated lugs provided with longitudinal bores, each bore being reduced in diameter between its ends to provide oppositely facing shoulders, a locking pin slidable in each bore and having a collar adapted to bear against one of said shoulders, a nut within said bore threaded onto one end of said locking pin, a spring surrounding said pin and bearing with one end against said nut and with its other end against the other shoulder of said bore, said pins projecting beyond the coupling end of the female member and having heads or enlargements at their projecting ends, a locking ring rotatable on said male member and adapted to bear against the flange thereof, said locking ring having segmental slots each provided with enlarged entering portions at one end and with inclined bearing portions extending from said enlarged entering portion to the opposite end of the slot, the heads of said pins being adapted to enter said slots through said entrance portions and to engage said inclined bearing portions and place the springs under increasing tension as the locking ring is rotated to firmly force the male and female members together.

5. A hose coupling comprising a male member having a stepped external flange between its ends, a female member having an internal shoulder and externally-elongated lugs at diametrically opposite points, said lugs being provided with longitudinally-disposed bores having restricted intermediate portions providing oppositely facing shoulders, a gasket seated against the internal shoulder of said female member against which the end of the male member is adapted to bear, locking pins within said bores having collars adapted to normally bear against one of the shoulders of said bores, an adjustable member on each locking pin, springs surrounding said locking pins and bearing with one of their ends against said adjustable members and with their other ends against the other shoulders of said bores, a locking ring having a central opening counterbored to conform to and receive the stepped external flange of said male member and having also segmental slots provided with enlarged entrance portions at one of their ends and inclined portions extending from said entrance portions to the opposite ends of said slots, said slots having depressions adjacent the highest points of said inclined portions and said locking pins being normally held in projecting position and having enlargements at their projecting ends, said enlargements being adapted to be thrust through the enlarged entrance portions of said segmental slots to engage the inclined portions of the latter when turning said locking ring and being adapted to enter the depressions of said slots.

In testimony whereof I affix my signature.

RUDOLF W. BOJE, Jr.